US006816483B1

(12) United States Patent
Beckstrom et al.

(10) Patent No.: US 6,816,483 B1
(45) Date of Patent: Nov. 9, 2004

(54) SWITCHED VIRTUAL CIRCUIT CALL PROCESSING/ROUTING SYSTEM

(75) Inventors: Gary Beckstrom, Sunnyvale, CA (US); Pradip N. Nirmel, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/410,229

(22) Filed: Sep. 30, 1999

Related U.S. Application Data

(60) Provisional application No. 60/144,417, filed on Jul. 16, 1999.

(51) Int. Cl.$^7$ ................................................ H04L 12/66
(52) U.S. Cl. ........................ 370/356; 370/522; 379/234
(58) Field of Search ................................ 370/221, 230, 370/220, 442, 470, 471, 410, 395.61, 392, 522, 235–238, 352–356; 379/9, 229–231, 234

(56) References Cited

U.S. PATENT DOCUMENTS

| | | | | |
|---|---|---|---|---|
| 5,802,045 A | * | 9/1998 | Kos et al. ................... | 370/352 |
| 5,835,696 A | * | 11/1998 | Hess ........................... | 714/10 |
| 5,974,114 A | * | 10/1999 | Blum et al. .................. | 379/9 |
| 6,081,525 A | * | 6/2000 | Christie et al. ............. | 370/392 |
| 6,128,291 A | * | 10/2000 | Perlman et al. ............. | 370/352 |
| 6,181,703 B1 | * | 1/2001 | Christie et al. ............. | 370/410 |
| 6,324,179 B1 | * | 11/2001 | Doshi et al. ........... | 370/395.61 |
| 6,353,610 B1 | * | 3/2002 | Bhattacharya et al. ...... | 370/352 |
| 6,363,064 B1 | * | 3/2002 | Yamaguchi .................. | 370/352 |
| 6,404,782 B1 | * | 6/2002 | Berenbaum et al. ........ | 370/522 |
| 6,546,004 B2 | * | 4/2003 | Gullicksen .................. | 370/352 |

OTHER PUBLICATIONS

Cisco Technology, Inc., "Voice Network Switching System," published on Mar. 30, 1998, pp. 1–4.
Cisco Technology, Inc., "Introduction to Voice Network Switching," published on Dec. 18, 1997, pp. 1–26.
Cisco Technology, Inc., "Introduction to Voice Network Switching," published on Mar. 30, 1998, pp. 1–27.

* cited by examiner

Primary Examiner—Frank Duong
Assistant Examiner—Melanie Jagannathan
(74) Attorney, Agent, or Firm—Marger Johnson & McCollom, PC

(57) ABSTRACT

A method for operating a switched virtual circuit call processing/routing system, and a computer readable medium containing a call processing/routing program for a voice network switching (VNS) system are disclosed. In a preferred embodiment, an adjunct processor is attached to a network node and software-configured to service the switching needs of one or more PBXs that are also tied to the network node. The service capability offered by the software-configured adjunct processor alows PBXs to establish voice and data connections between each other dynamically via Switched Virtual Circuits (SVCs) that are routed directly across a WAN. This arrangement eliminates the need for an extensive mesh of PVCs or leased "tie lines" carrying voice and data traffic between PBXs across the WAN. It also eliminates the need for routing connections in multiple hops between PBXs. Another advantage is that the number of physical interfaces required on the PBXs and the attached switches is reduced. Also, the adjunct processor approach generally requires no modification to the PBX software in order to interoperate with the PBX.

In the preferred embodiment, the SVC functions are handled in one process, and the PBX signaling/call processing functions are handled in another process, with the two processes communicating via a message pipe. Other than the requests and results passed via the pipe, each process is largely unconcerned with the operation of the other. This division of labor simplifies the otherwise complex VNS operational tasks into two groups of related tasks that can each be handled separately, simplifying operation and isolating changes in one "end" of the system from affecting the other.

31 Claims, 7 Drawing Sheets

SWITCHED VIRTUAL CIRCUIT CALL PROCESSING/ROUTING SYSTEM

This application claims the benefit of Provisional application Ser. No. 60/144,417 filed Jul. 16, 1999.

FIELD OF THE INVENTION

This invention pertains generally to switching between several Private Branch Exchange units (PBXs), and more particularly to an adjunct software-configured system for performing such switching within a wide-area network.

BACKGROUND OF THE INVENTION

A Private Branch Exchange (PBX) is an automatic telephone switching system that enables users within an organization to place calls to each other without going through the public switched telephone network (PSTN). Many large organizations require the deployment of numerous PBXs to cover their organization.

Although an organization could connect each of their PBXs to the PSTN, and then rely on the PSTN in order to interconnect their PBXs, this approach is not always preferred. Leased tie lines between sites are generally expensive. Since the organization usually maintains a Wide Area Network (WAN) for data communications between its various buildings and sites, it would be preferable if PBX-to-PBX communications could be routed across the WAN.

FIG. 1 shows an example of one configuration for connecting PBXs across a WAN. Four PBXs A, B, C, and D connect to WAN 16. Each PBX connects directly to one of switches 18, 19, 20, and 21, typically through one or more E1 or T1connections. Switches 18, 19, 20, and 21 communicate with each other using Frame Relay packets, ATM (Asynchronous Transfer Mode) cells, or another common WAN packet technology.

In order for the PBXs to communicate across WAN 16, a mesh of Permanent Virtual Circuits (PVCs) is set up between them. For instance PVC 22 connects PBXs A and B via a dedicated connection; likewise, PVC 24 connects PBXs C and D, PVC 26 connects PBXs A and C, and PVC 28 connects PBXs A and D. Although a Virtual Circuit only allocates a physical circuit when there is data to send, a PVC is similar to a dedicated private line because the connection is set up on a permanent basis.

A tradeoff exists between the number of PVCs that are set up between PBXs and the percentage of WAN bandwidth consumed. Although it may be practical to fully mesh the four PBXs of FIG. 1, with larger PBX networks partial meshing makes more sense in order to conserve bandwidth. Thus the PBXs of FIG. 1 are demonstrated as partially meshed. Although a caller on PBX A may directly contact a party attached to any of the PBXs, a caller on PBX B has no PVC directly available to a party attached to PBX C or PBX D.

With no direct PVC, it may still be possible for the caller to indirectly contact PBX C or D, by going through PBX A and using two tandem PVCs. But the use of tandem PBXs wastes PBX and WAN resources. It also generally precludes the use of a voice compression codec, or at least limits compression to one of the PVCs, as tandem encodings dramatically degrade sound quality.

SUMMARY OF THE INVENTION

The present invention allows existing packet/cell based PVC networks to function as dynamically-switched multi-service networks. An adjunct processor is attached to a network node, and software-configured to service the needs of one or more PBXs that are also tied to a network node. The service capability offered by the software-configured adjunct processor allows PBXs to establish voice and data connections between each other dynamically via Switched Virtual Circuits (SVCs) that are routed directly across a WAN. This arrangement eliminates the need for an extensive mesh of PVCs or leased "tie lines" carrying voice and data traffic between PBXs across the WAN. It also eliminates the need for routing connections in multiple hops between PBXs. Yet another advantage is that the number of physical interfaces required on the PBXs and the attached switches is reduced. Also, the adjunct processor approach generally requires no modification to the PBX software in order to interoperate with the PBX.

In one aspect, the present invention comprises a computer-readable medium containing a call processing/routing program for a voice network switching (VNS) system. This program has a switched circuit manager to set up and tear down switched virtual circuits on a multiple-switching-node wide-area network. The program also has a signaling process to exchange call signaling information with a private branch exchange connected to one switching node of the wide-area network and with a remote signaling endpoint. The program further has a call processor in communication with the switched circuit manager and the signaling process. The call processor determines a wide area network destination for a wide area network-routed call originating at the private branch exchange, based on call signaling information from the signaling process, and requests a switched virtual circuit, from the switched circuit manager, to service the wide area network-routed call. Preferably, the switched circuit manager is one execution thread of an administrative process that also monitors the WAN switching nodes attached to PBXs in the VNS service area. Also preferably, the administrative process also provides for communications with a standby VNS (or an active VNS if this one is in standby), and/or for communications with a network management system.

In a further aspect of the invention, a method of operating a voice network switching system connected in a wide-area network is disclosed. A first software process is configured to exchange call signaling information with a private branch exchange connected to a switching node of the wide-area network. The first software process is also configured to determine a wide-area-network destination, for a call originating at the private branch exchange, based on the call signaling information. A second software process is configured to establish and manage a switched virtual circuit between the node and the wide-area-network destination. A message path is provided between the first and second software processes. The first software process uses the message path to request the switched virtual circuit between the node and the wide-area-network destination, and the second software process uses the message path to notify the first software process when the switched virtual circuit has been established.

BRIEF DESCRIPTION OF THE DRAWING

The invention may be best understood by reading the disclosure with reference to the drawing, wherein.

DETAILED DESCRIPTION OF THE PREFERRED EMBODIMENTS

The embodiments described below are referred to with the term Voice Network Switching (VNS) because they allow circuit-switched bearer channels to be switched within a data network. The channels need not carry voice data, however, but may also carry fax data, modem traffic, or digital data.

Voice Network Switching is typically implemented with two or more VNS servers deployed in a WAN switching network. The VNS server, referred to herein simply as a VNS, is a standalone or rack-mounted adjunct processor co-located with a wide-area switch. VNS servers are preferably deployed in redundant pairs.

Figure 1:
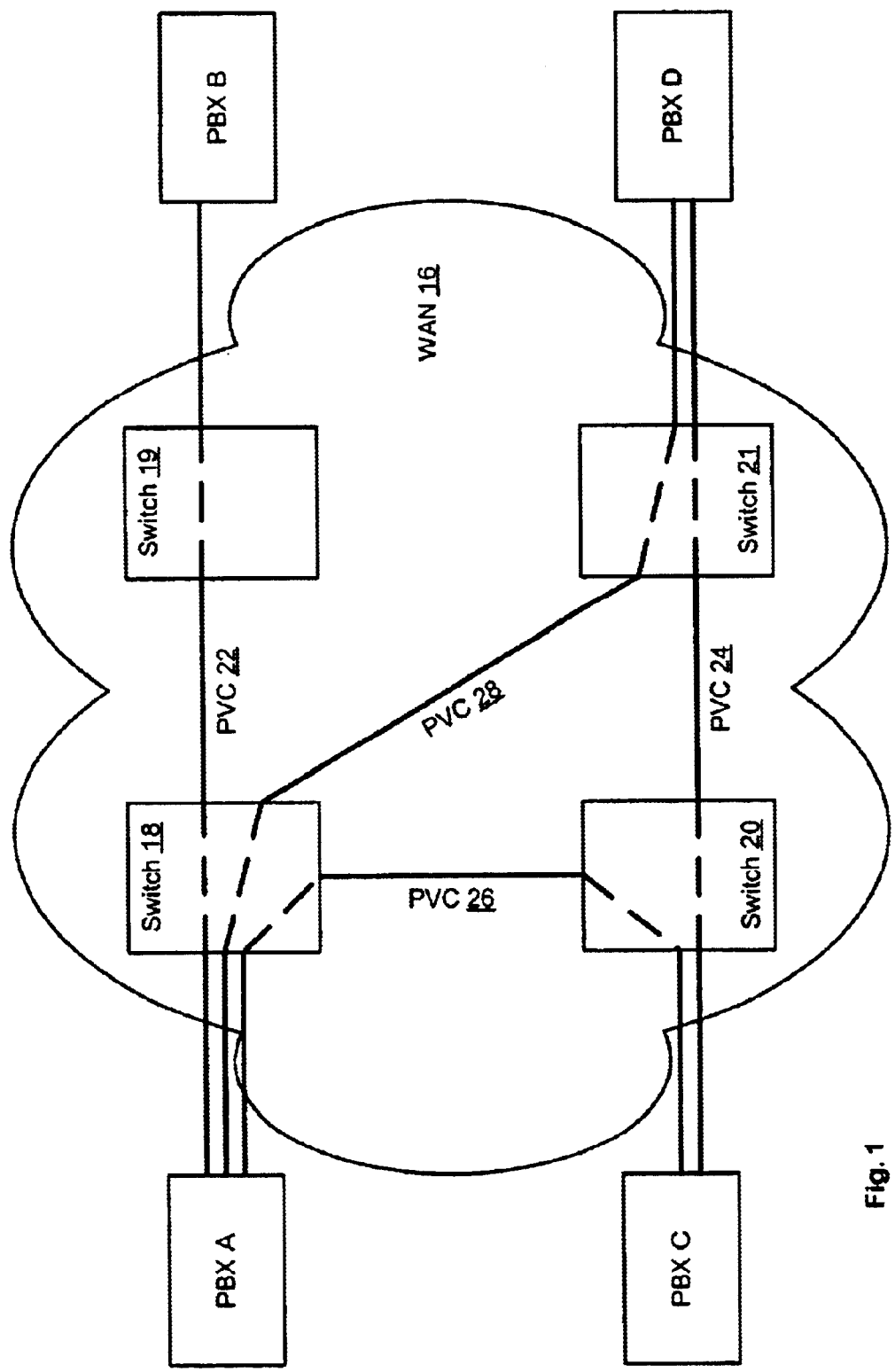
FIG. 1 illustrates a prior art approach to connecting PBXs through a WAN.
Figure 2:
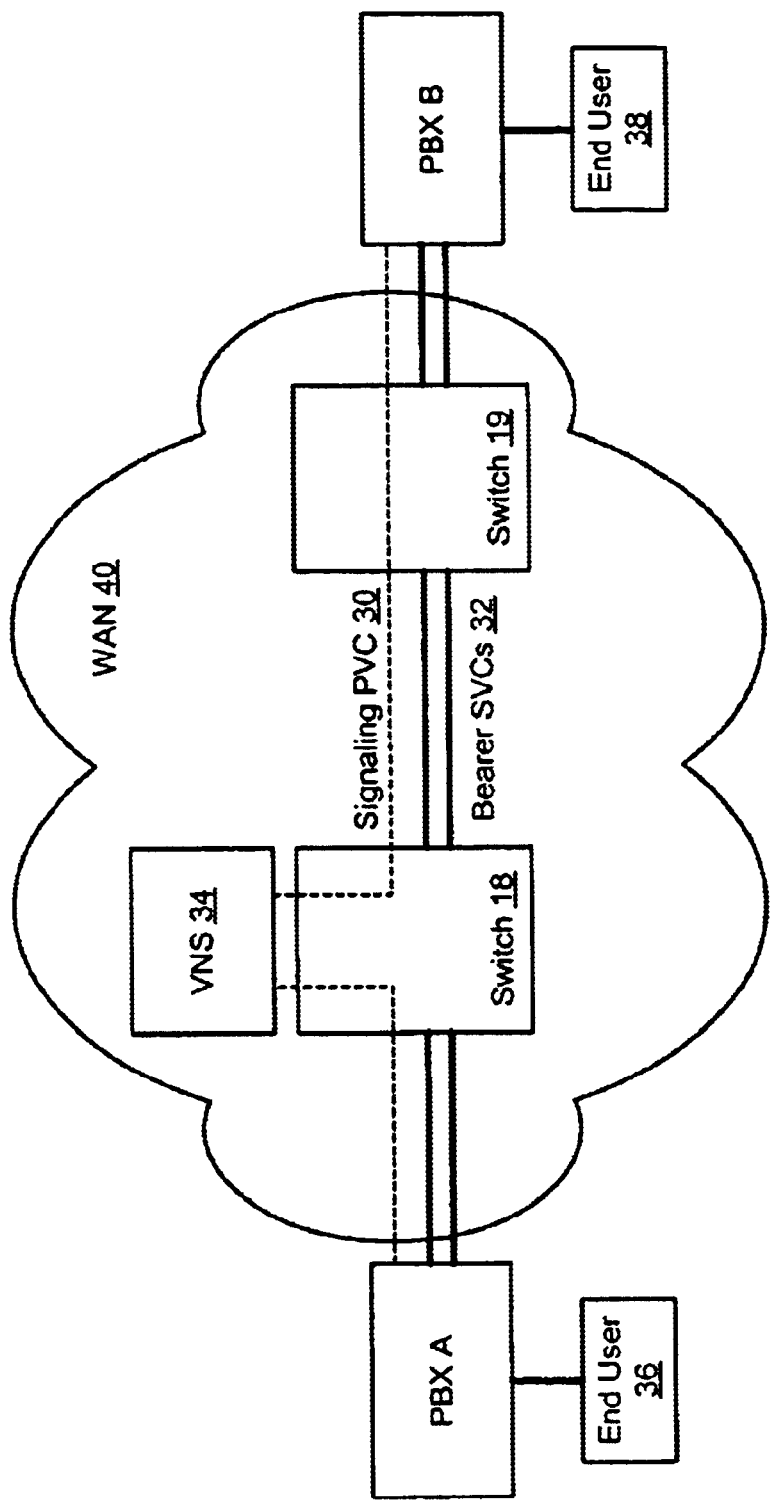
FIG. 2 illustrates connection of PBXs through a WAN using an embodiment of the invention.

FIG. 2 shows a basic VNS configuration. VNS 34 connects to switch 18, and provides a signaling mechanism to establish and maintain SVCs between PBX A and PBX B across WAN 40. Instead of the PBXs exchanging messages with each other, however, they each exchange messages with the VNS. A signaling channel is maintained between each PBX and VNS 34. These signaling channels are overlaid on the WAN, such that for remote PBX B, a signaling PVC 30 is required (PBX A is local, i.e., attached to the same node as VNS 34, and requires that switch 18 route signaling between the PBX A port and the VNS 34 port). Voice and data traffic pass over WAN 40 on SVCs 32, which are created and destroyed by VNS 34 as required.

In this basic illustration, a typical call setup would follow this sequence: First, end user 36 places a call to end user 38. PBX A then initiates a call setup message, e.g., using a common signaling protocol such as DPNSS, QSIG, Q931A, or AT&T 4ESS ISDN format; this message is passed from switch 18 to VNS 34. Next, VNS 34 processes this message, including determining whether this will be a data or a voice call. VNS 34 then instructs switch 19 to build a circuit 32 from PBX A to PBX B, in a similar fashion as adding a connection for a standard network. When the circuit is built, switch 19 passes a message to VNS 34, which relays this information over signaling PVC 30 to PBX B. When end user 38 at PBX B answers the call, a connect message is sent from PBX B to VNS 34. Finally, VNS 34 sends a connect message to end user 36 at PBX A, and the connection setup is completed.

A typical call disconnect would follow this sequence: When either party hangs up, a release message is sent from the associated PBX through the signaling channel to VNS 34. Circuit 32 is removed by the VNS that created it, and a call release message is sent from VNS 34 through the signaling channel to the other PBX and its end user. After the end user acknowledges the release message, the call is cleared. The originating VNS also generates a Call Detail Record (CDR), which includes the calling and called party numbers, call setup time and call duration. CDRs are kept on the VNS in files that can be periodically collected by another host, such as a network management system. Each VNS also keeps other statistics for maintenance and diagnostic purposes.

Figure 3:
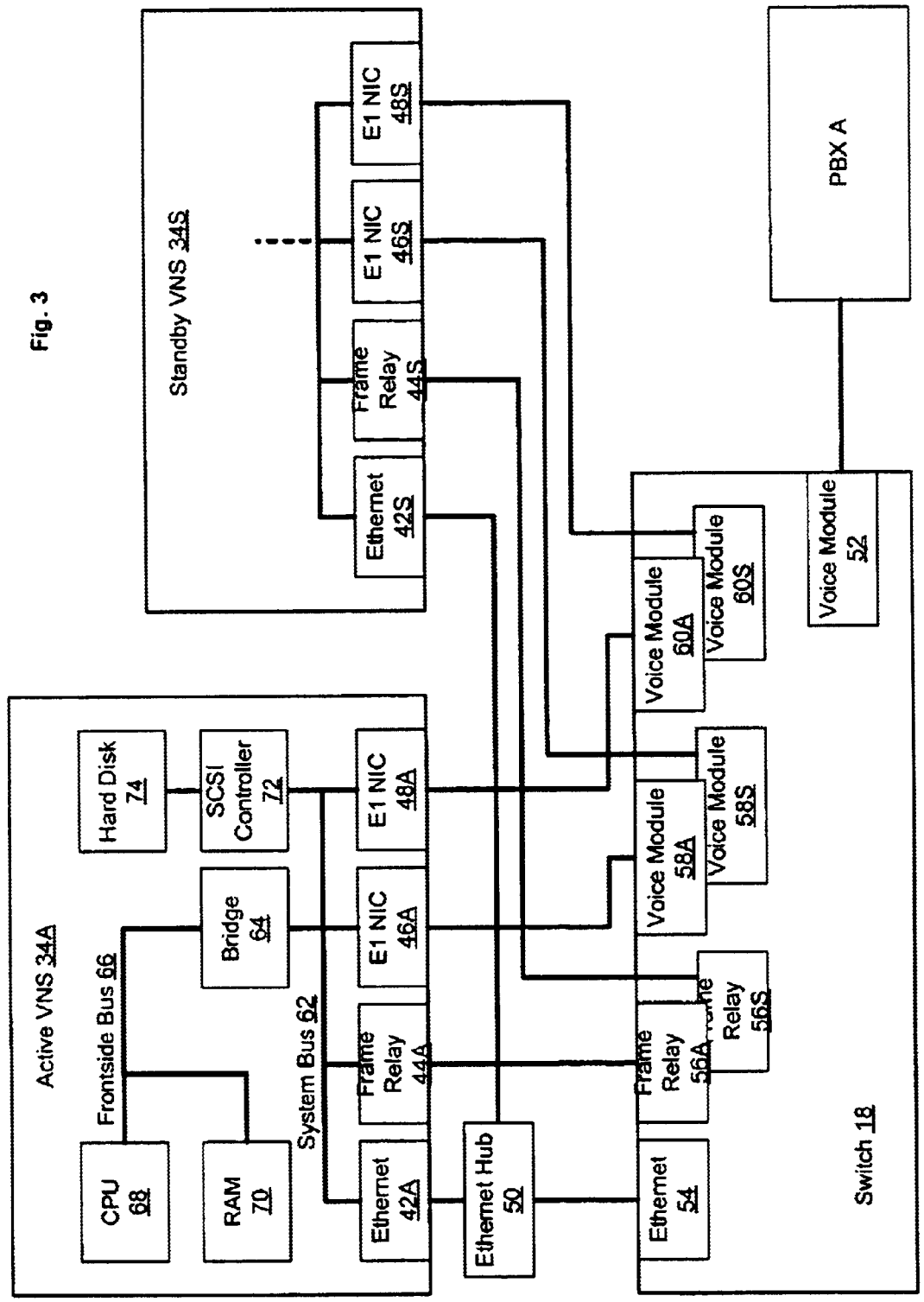
FIG. 3 illustrates one VNS server configuration and a VNS system configuration for an embodiment of the invention.

FIG. 3 shows a block diagram of a typical VNS system configuration. A VNS system consists of two identical VNS servers 34A and 34S, which can be configured to perform as a redundant pair comprising an active VNS and a standby VNS. Each VNS server is a closed, scalable multitasking platform such as a workstation. As such, a typical server has a CPU 68 and random access memory 70 connected by a frontside bus 66. A bridge 64 connects the frontside bus to a system bus 62. System bus 62 supports multiple communication cards, as well as a SCSI controller 72 connected to disk drive 74.

The VNS system is typically connected to a co-located wide-area switch 18 and is often mounted in the same rack. Each VNS in the pair is connected to the wide-area switch through a Frame Relay card (44A and 44S), a pair of E1 channelized Network Interface Cards (E1 NICs 46A, 48A and 46S, 48S), and an Ethernet (that is, IEEE 802.3) interface (42A and 42S). The Frame Relay connection is used for communication between VNS systems attached to the same WAN but having different service areas. The E1 NICs are used to pass signaling information between the VNS and the PBXs it services. The Ethernet interface is used for various communications between the VNS and its twin, the VNS and the switches in its service area, the VNS and a network management system, and the VNS with network-connected terminals via telnet.

Within switch 18, voice modules 52, 58A, 58S, 60A, and 60S each provide a line interface for an E1 or T1 line connection (these connections may go through a single access concentrator). The voice modules convert between TDM data streams and packet-based data, and may also provide other services. In particular, voice module 52 may provide compression and decompression services for voice bearer channels, as well as silence detection.

Each E1 Network Interface Card (NIC) in a VNS server can interface with 30 signaling channels. The second E1 NIC card in the VNS provides redundancy. Thus although there are two E1 NICs installed in every VNS, they both do not have to be connected to switching node 18. And although FIG. 3 shows the active and the standby VNSs connected to different switching node Frame Relay cards 56A and 56S, they do not have to be. They could be connected to different physical ports on the same card. The VNSs are typically connected to one another and to the node through a 10BaseT Ethernet hub 50.

The preferred redundancy feature provides VNS-based redundancy that is not based on normal voice module-based redundancy. With normal voice module-based redundancy, each E1 NIC card in a VNS has to be connected through a Y-cable to two voice module cards in the node. So theoretically to provide redundancy for all the node's voice module cards attached to the VNS, a redundant pair of VNSs with 4 E1 NIC cards would require 8 voice module ports.

The VNS voice module redundancy feature eliminates the need for redundant voice module ports attached to each E1 NIC card. This feature, which can be enabled or disabled using the VNS Command Line Interface, processes voice module card failure SNMP Traps from the node. When a voice module fails, the VNS receives a Trap. The VNS determines if the failed voice module is attached to a VNS E1 NIC. If the failed voice module is attached to the VNS, and the standby VNS is up and not in a failed state, the VNS will trigger a switchover to the redundant standby VNS.

The VNSs will change roles, i.e., switchover, when the active VNS is no longer in normal operation or when the network operator changes their modes through a command line interface. The former case will be detected by the standby VNS missing Keep Alive messages from the active VNS; the latter case is indicated by an operator-issued SNMP SET command that changes the VNS role in the MIB (Management Information Base). When a switchover occurs, existing SVC calls created by the active VNS will be cleared, and PBX-to-VNS signaling PVCs will be switched over to the newly active unit, which will assume the same provisioning and configuration as was maintained by the previous active VNS.

Figure 4:
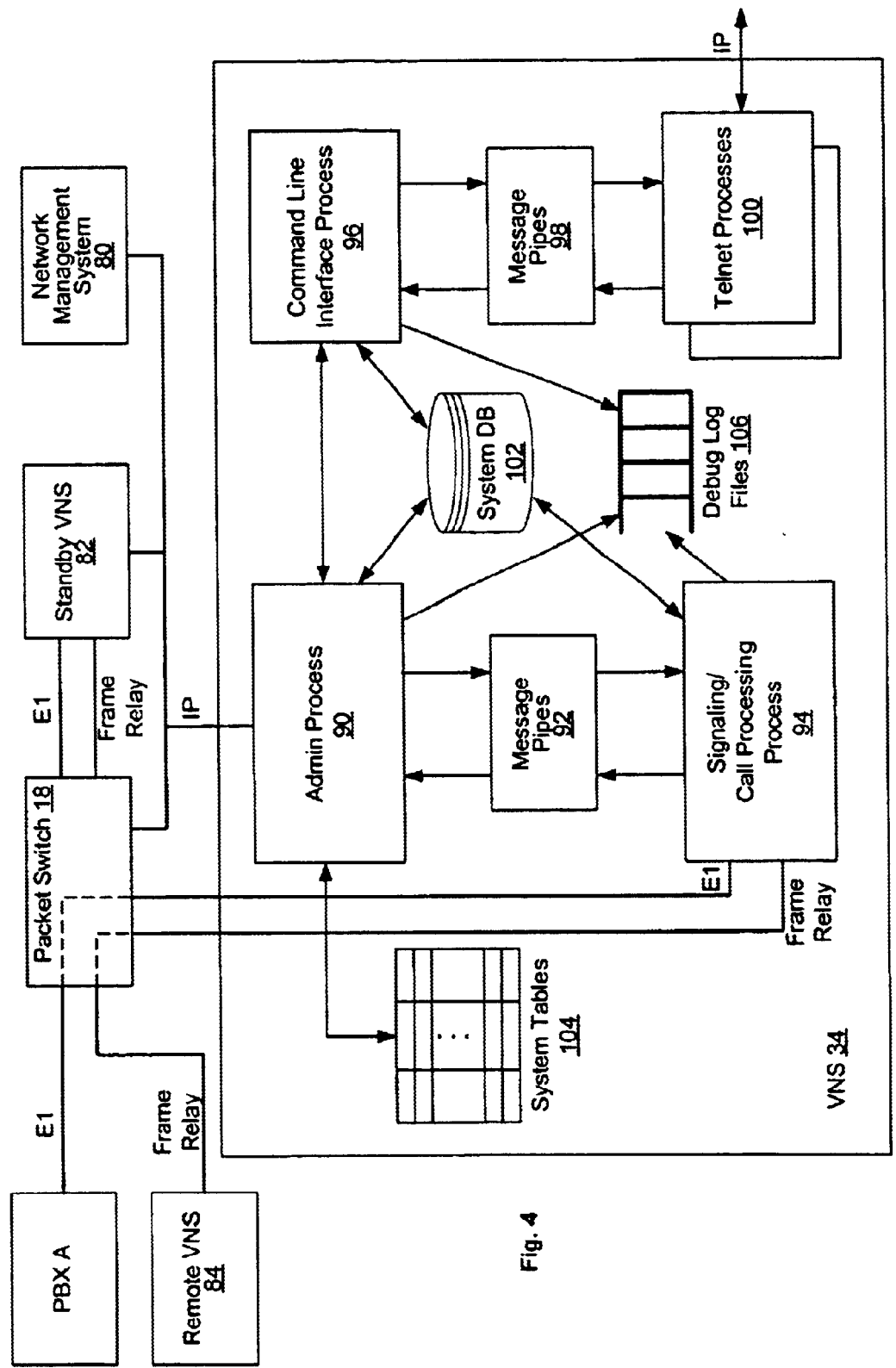
FIG. 4 shows processes that execute on a VNS server according to one embodiment of the invention, including their internal and external communication paths.

FIG. 4 illustrates the main processes that run on VNS 34, including their primary internal and external connections. The two main VNS processes are admin process 90 and signaling/call processing process 94. Admin process 90 handles virtual circuit building and tear-down, network status detection and monitoring, communications with the standby VNS, and provides a network management system interface. Signaling/call processing process 94 handles PBX signaling, signaling exchange with remote VNS 84 (if VNS 84 exists), and call control. A set of message pipes 92 allow admin process 90 and signaling/call processing process 94 to coordinate their operations.

Several secondary processes can also run in conjunction with the VNS. The VNS Command Line Interface (CLI) process 96 is run from the VNS multitasking platform, either from a directly connected terminal or remotely through a telnet session (telnet users can perform these functions by accessing command line interface process 96 via message pipes 98 and telnet processes 100). The VNS CLI provides a mechanism for an operator to configure the VNS and provision VNS services. Using an SNMP interface to VNS, the CLI can configure the VNS database, provision (or delete) addresses in the database, and get the VNS operational status.

System tables 104 are typically stored in RAM, and contain configuration and status information for switching nodes, cards installed in the switching nodes, ports on those cards, mapping from ports to PBXs, voice/fax bearer capabilities, and debug levels available. Admin process 90 uses this information to monitor equipment status, route calls, and manage switched virtual circuits.

Figure 5:
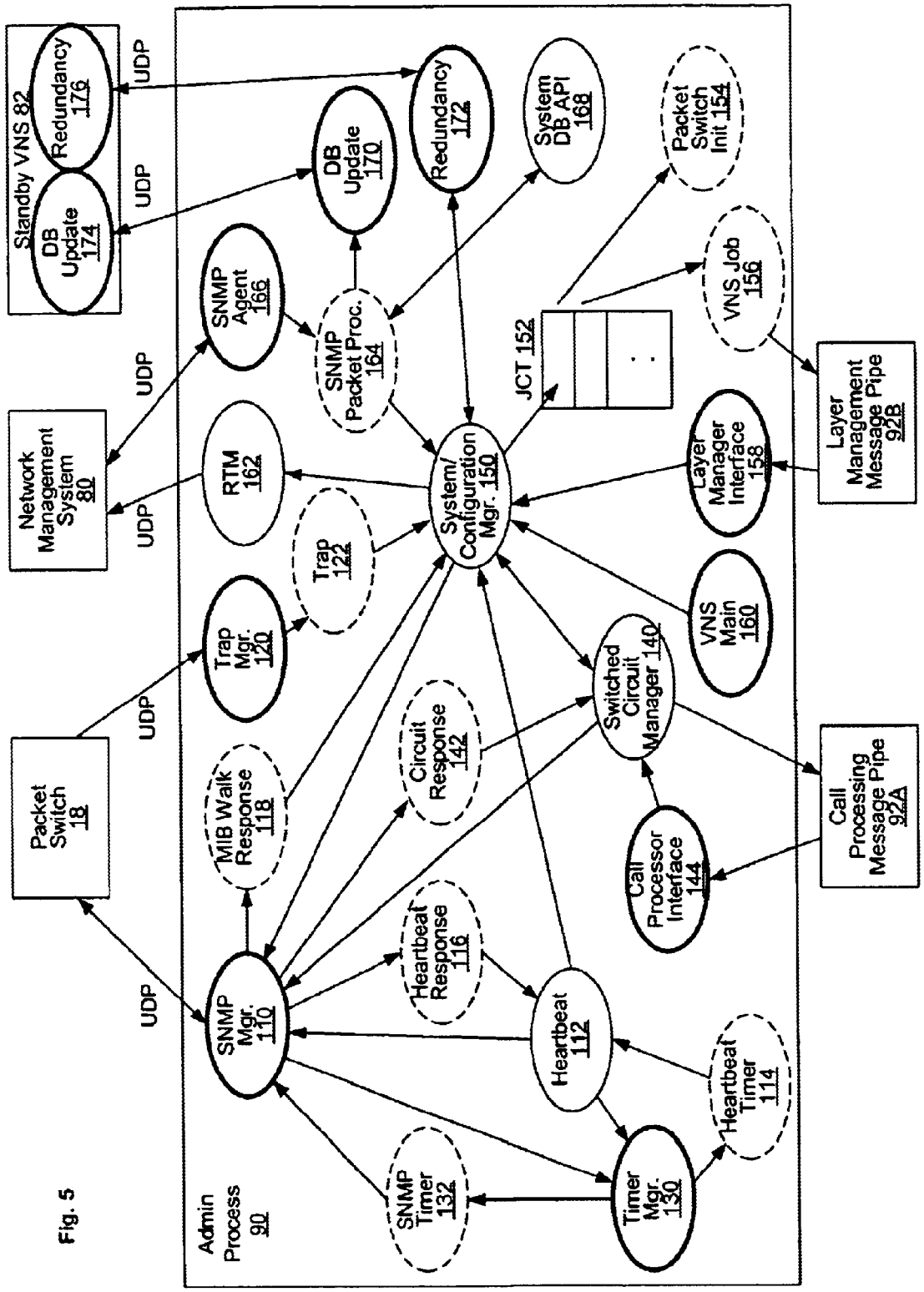
FIG. 5 depicts, for an administrative process, various threads of the process and their interactions.

FIG. 5 shows various process threads for admin process 90. VNS main 160 represents the initial process thread. VNS main 160 kicks off system/configuration manager thread 150. The other threads shown in bold outline are also started during initialization, while those shown in dashed outline are transient in nature and may have multiple instances running concurrently. The operation of each thread will be explained briefly below.

SNMP (Simple Network Management Protocol) manager thread 110 communicates with SNMP agents located on the switches serving PBXs in the VNS service area. This thread is responsible for communications between WAN network elements and a variety of threads in admin process 90. It operates in conjunction with timer manager 130, which creates an SNMP timer thread 132 for timed SNMP requests such as status requests and circuit build requests. Timers are used to detect unresponsive network elements.

Also related to timer manager 130 is heartbeat thread 112 and heartbeat timer 114. Heartbeat thread 112 periodically issues status requests to various hardware elements in the systems tables, allowing the VNS to determine whether they are still on line. Heartbeat response 116 returns status from the hardware; this information may then be passed to system/configuration manager 150 if the detected status requires action.

The SNMP manager also sends responses to an initial hardware status query to the MIB (Management Information Base) walk response thread 118. These responses are used to initialize the system tables (not shown for clarity).

Switched circuit manager 140 handles building and tearing down switched virtual circuits. Generally, a request for a circuit will be routed through call processing message pipe 92A and call processor interface 144 to switched circuit manager 140. Switched circuit manager 140 signals SNMP manager 110 to request an SVC from a switch; circuit response thread 142 receives a return indication from the switch for the action (e.g., set up successful, set up failed, etc.). Switched circuit manager 140 relays circuit setup messaging back to the signaling/call processing process through call processing message pipe 92A.

One of the jobs of system/configuration manager 150 is to communicate with the layer manager of the signaling/call processing process regarding, e.g., E1 channel allocation. Layer manager interface 158 handles the receipt of information from the layer manager (through layer management message pipe 92B), and passes this information to system/configuration manager 150. Manager 150 keeps Job Control Table (JCT) 152. Information in this table is passed back to the layer manager through message pipe 92B, and is also used by packet switch init 154 to create signaling PVCs between the VNS and the PBXs that it serves.

Another thread maintained by process 90 is trap manager 120. Trap manager 120 receives indications from packet switch 18 of hardware problems. When such an indication is received, a trap thread 122 is created for the purpose of relaying this information to system/configuration manager 150. Likewise, RTM (Robust Trap Mechanism) 162 can be used by system/configuration manager 150 to report VNS problems to network management system 80.

Network management system 80 also has an SNMP manager (not shown) that communicates with SNMP agent 166. This communication path allows a network operator to gather information from the VNS and/or modify system parameters or the system database (through system database API 168).

Finally, two threads are used to communicate with standby VNS 82. The database update thread 170 performs a database dump to the standby VNS when it comes up. Redundancy thread 172 is used to resolve redundancy roles and for sanity checking between the two VNS servers.

Various threads can write to the system tables 104 (see FIG. 4, not shown in FIG. 5 for clarity). These threads include packet switch init 154, switched circuit manager 140, SNMP manager 110, and system/configuration manager 150.

Figure 6:
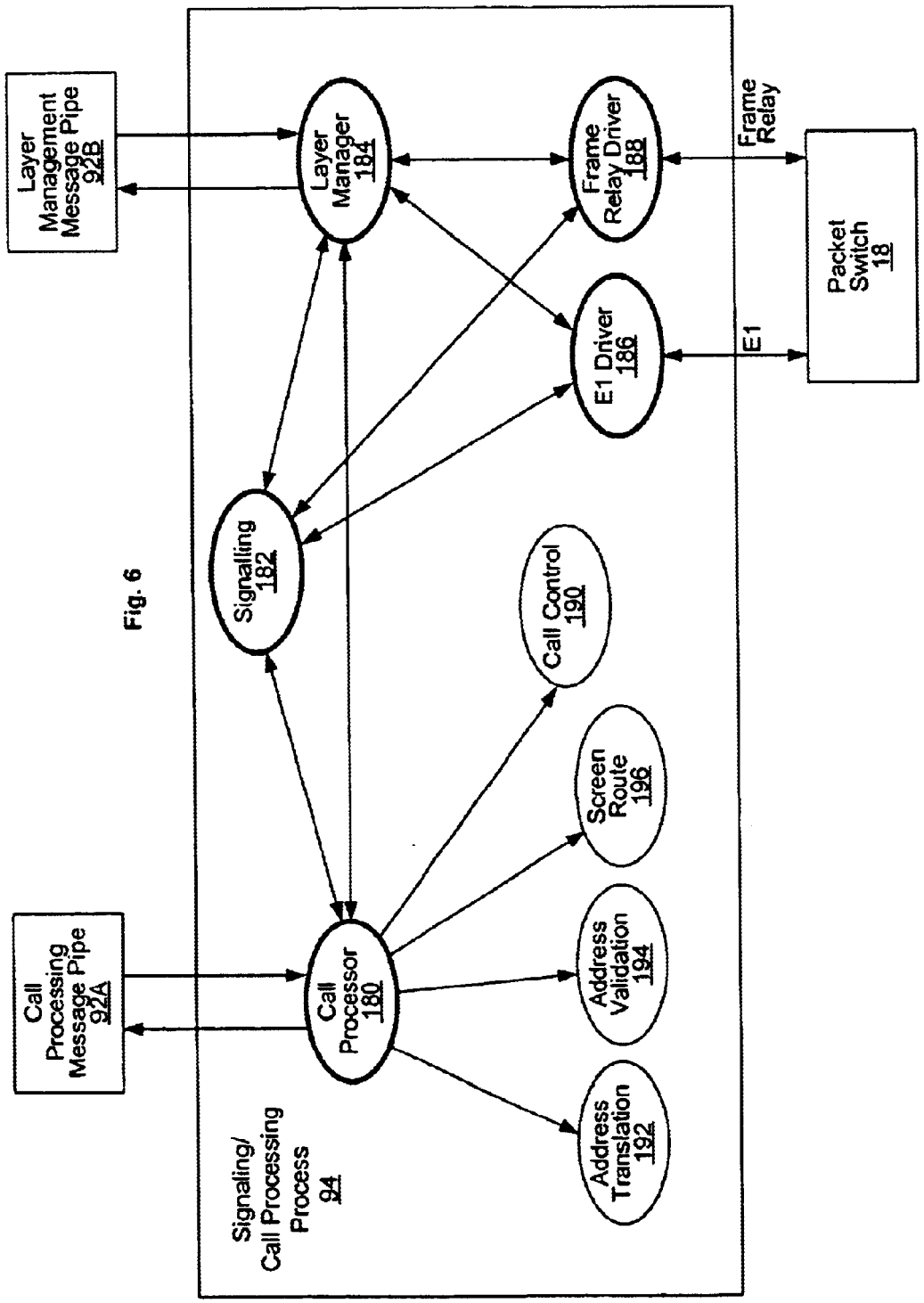
FIG. 6 depicts, for a signaling/call processing process, various threads of the process and their interactions.

Turning now to FIG. 6, the threads of signaling/call processing process 94 are depicted. Two threads (call processor thread 180 and layer manager thread 184) communicate with the admin process through message pipes 92A and 92B. Call processor thread 180 provides call routing and control services. Layer manager thread 184 provides administrative functions to manage components of process 94. Layer manager 184 also interfaces with admin process 90 to receive call translation numbers and store these in tables for process 94, and to notify admin process 90 of events, e.g., a link going down or coming up.

Call processor thread 180 relies on address translation thread 192, address validation thread 194, and screen route thread 196 to provide its routing services. Call control thread 190 manages call states for active calls.

Layer manager thread 184 and signaling thread 182 each communicate with E1 driver thread 186 and frame relay driver thread 188, which communicate signaling information to and from their respective NICs. Since the frame relay connection is only used for communication with remote VNS systems, if the network contains a single VNS system frame relay driver thread 188 is not needed. It is also recognized that instead of using a frame relay connection, the VNS could communicate with a remote VNS system via the E1 interface, although this uses a channel that could otherwise be used for communication with a PBX.

Signaling thread 182 interprets signaling received from PBXs and remote VNS systems. Preferably, this thread can comprehend multiple signaling protocols. For example, in one embodiment the signaling between the VNS and the PBXs can be based on one of six ISDN (Integrated Services Digital Network) signaling variants. These include:

(1) AT&T 4ESS ISDN protocol variant in accordance with Technical Reference 41459-*AT&T Network ISDN Primary Rate Interface and Special Application, User-Network Interface Description* (AT&T, August 1996). This includes support for various options, including symmetrical slave without channel negotiation, Basic Call with detection of Bearer Capability information for voice and data, pass calling and connection line ID, and calling and connected line ID restriction.

(2) Digital Private Network Signaling System (DPNSS) in accordance with BTNR (British Telecommunications Network Requirement) No. 188, Issue 5, Vols. 1–5, December 1989.

(3) QSIG based on ETSI QSIG standards.

(4) European ISDN (ETSI).

(5) Q931A, also known as Japanese ISDN, based on JT-Q.931-a (layer 3), JT-Q.921-a (layer 2), and JT-i.431-C (layer 1 . . . JT) specifications as described by TTC.

(6) CAS 2.2, a VNS QSIG protocol designed to work with a switch's Voice Module to provide Voice Network Switching for PBXs using CAS signaling.

Voice Network Switching was designed to work with five forms of message-oriented common-channel signaling often used by PBXs—DPNSS, QSIG, ETSI, Q931A (Japanese ISDN), and AT&T 4ESS ISDN. These messages set up, maintain, and terminate voice channel connections. They also support the operation of many PBX supplementary services or features, including calling name and number display, network call forward, network call redirect, centralized attendant, centralized voicemail, etc. These signaling protocols support a set of capabilities that are very desirable in an enterprise voice network. The wide-area switches function as transit nodes for these networks, receiving call control and feature messages from PBXs via their signaling-channel connection and forwarding these messages across the signaling overlay network to the appropriate destination PBX.

DPNSS, QSIG, and Q931A are variants of ISDN D-channel signaling. QSIG is based on ISDN Q.921/931 standards. DPNSS is a pre-ISDN standard protocol, developed by British Telecommunication (BT) in the 1980s. QSIG was originally specified by ECMA, then was adopted by European Telecommunications Standards Institute (ETSI) and the ISO. It is becoming a world-wide standard for PBX interconnection. ETSI is also used as the name for European ISDN. Q931A is based on Japanese ISDN standards. All of these protocols (DPNSS, QSIG, ETSI, and Q931A) are supported by a different signaling stack in the VNS. Thus in VNS, a signaling stack refers to the particular signaling protocol to be supported by the VNS for a given PBX.

In addition to single VNS systems, multiple VNS systems can also be designed. With a multiple VNS system, each VNS (or redundant pair of VNSs) are assigned to control a group of one or more switching nodes. These nodes are considered the VNS's service area (or domain). The VNS will be directly attached to one of the switching nodes in its area. The VNS processes call setup or release requests for calls originating in its area, or calls received from another area but destined for this one. VNS areas do not overlap. This feature is referred to as multiple domains.

The VNS exchanges heartbeat messages with all of the switches in its area. The heartbeat allows the VNS to maintain a status of each node in its area. The VNS detects if a node goes out of service or returns to service.

Figure 7:
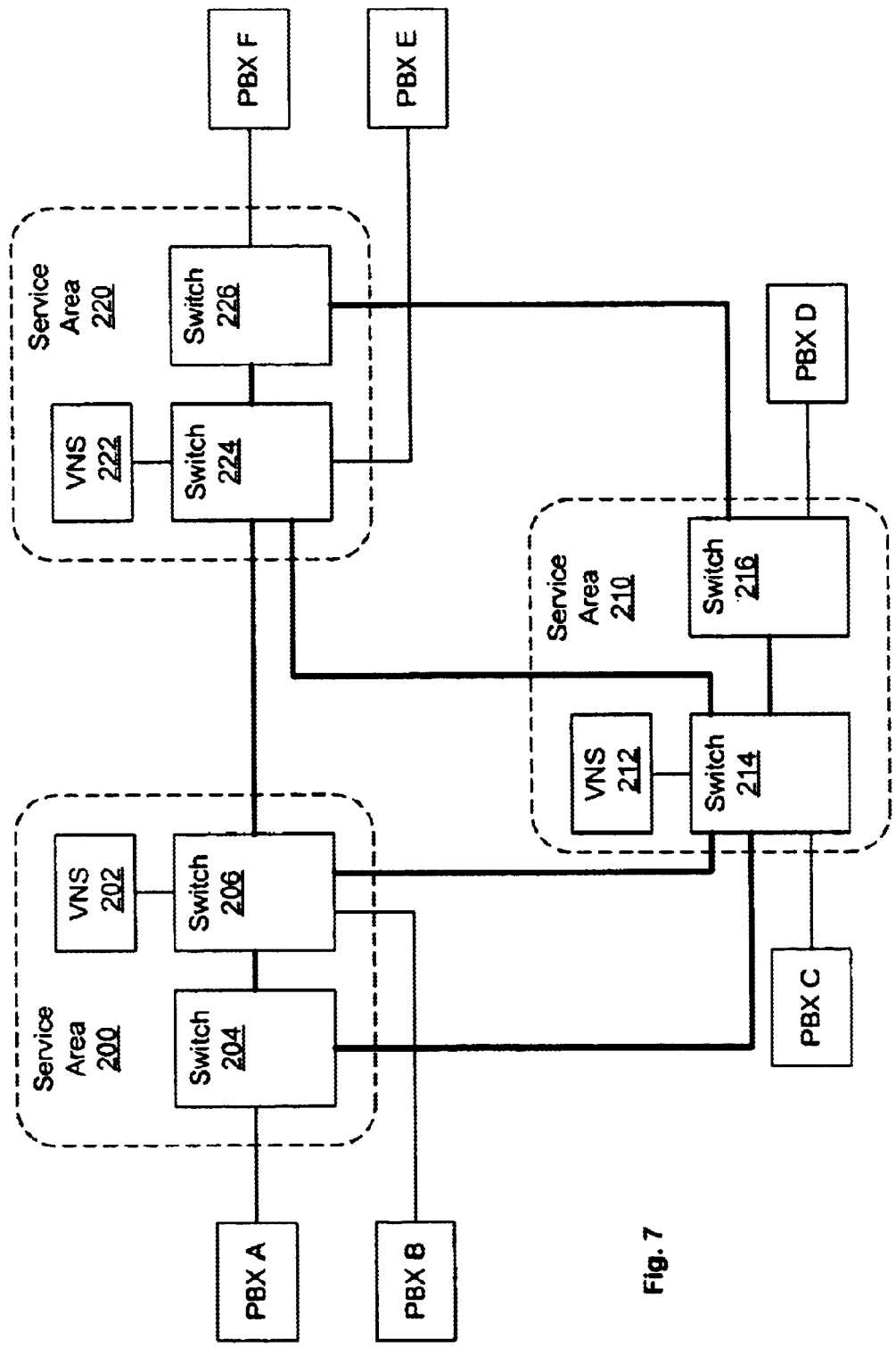
FIG. 7 shows a multiple service area VNS network.

FIG. 7 illustrates a network with three VNS service areas 200, 210, and 220. Although it is not shown in the figure, the VNSs in each area will be installed as redundant pair in each area. There is one VNS system (one redundant pair of VNSs) serving each individual service area (or domain).

In FIG. 7, each VNS has two switches in its area. VNS 202 has switches 204 and 206, VNS 212 has switches 214 and 216, and VNS 222 has switches 224 and 226. VNS 202 exchanges heartbeat messages with switches 204 and 206. Each switch is connected to one PBX with its complement of end users. So in Area 200, VNS 202 would be responsible for processing call setups for all calls from PBX A and PBX B. It would also handle calls destined for PBX A and PBX B. Similarly, VNS 212 would be responsible for call setups for PBX C and PBX D, and VNS 222 would be responsible for PBX E and PBX F.

Setting up and tearing down SVCs in a multi-service area system is a somewhat involved process. The following description describes what happens on the three main interfaces: PBX to VNS; VNS to VNS; and VNS to switching node.

First, the PBX to VNS interface. For the VNS application, the PBX connects to a wide-area switch through a voice module, which terminates an E1 PRI (Primary Rate Interface). The E1 PRI contains both the bearer channels with user's voice or data and a D channel, the signaling channel. The bearer channels should be routed to the far-end or whichever termination point the user is trying to call. Before that can happen, the network must setup the call or calls. The signaling channel, the D channel, carries the messages to begin the call setup process.

Therefore, the D channel must be routed to the VNS responsible for the node to which the PRI is connected. In FIG. 7, VNS 202 has two nodes, local switch 206 and remote switch 204, in its area. There are two PBXs, PBX A and PBX B, attached to these nodes. Both of these PBXs have E1 PRI interfaces terminating on a voice module in the appropriate switch. In the E1 PRI, the signaling channel, typically timeslot 16 (TS16), must be routed to the VNS over a PVC. There must be a signaling channel configured (i.e., a PVC added) for every PBX in a VNS's domain.

So in FIG. 7, there would be two PVCs providing signaling channels to VNS 202. The first would be a local connection, i.e., a DACS connection on local node 206 connecting the voice module connected to PBX B to the voice module connected to the VNS 202's E1 NIC. The other signaling channel would be from the voice module on remote node 204 that is connected to PBX A to VNS 202's E1 NIC. This PVC would be carried over an E1 trunk between switches 204 and 206 (remember that an E1 NIC can manage up to 30 signaling PVCs).

The second interface involved is a VNS to VNS interface. In a Voice Network Switching network with multiple domains, every VNS must be able to communicate with every other VNS in the network. This full-mesh topology provides the overlaying signaling plane necessary for the network to route and deliver SVCs. This messaging plane provides flow control mechanisms, so that once a call is admitted, it will be reliably delivered to the destination. (The VNS-to-VNS interface is only required when there are multiple VNS areas.)

In FIG. 7, VNS 202 and VNS 212 are in different areas. They each reside over their own domain. They are both directly attached to a switch through a Frame Relay Module (FRM). There must be a frame relay PVC configured between the two VNSs. When there is a Frame Relay PVC established between the two VNSs, they are considered to be locally adjacent. The VNS serving the calling party passes messages to the locally adjacent VNS serving the called party in order to initiate a connection between service areas. The second VNS may establish an SVC directly to the switch serving the called party.

Finally, a VNS must be able to communicate with its nodes, e.g., the Nodal Processor Module (NPM) contained in each of the switches in its area. The VNS-to-local switching node Ethernet interface provides IP connectivity used for exchanging IP messages between the VNS and both local and remote nodes.

These IP-based messages are exchanged for the following purposes: to exchange circuit build commands and responses; to report circuit/port/card status to the VNS (the VNS needs to be informed of all the interface outages so that it can clear all the calls that go through those interfaces outages); to exchange heartbeat messages (the VNS needs to detect when the node fails or has gone out of service so that the VNS can clear all the calls that go through the downed equipment).

Before the Voice Network Switching network can provide SVCs in response to a call from a PBX, the individual VNSs must be both configured and provisioned.

VNS configuration includes: setting the VNS up for the local environment; configuring PVCs between the PBX E1 PRIs and the VNS; and configuring PVCs between every VNS in the network (this last step is only necessary when there are multiple VNS areas).

Provisioning, which is done mainly through the VNS CLI, includes the following tasks: adding cards to a switch, configuring the cards, and entering the information to the VNS's service database; configuring ports and entering the information in the VNS database; assigning addresses to B channels (bearer) channels on the E1 PRI; and propagating new addresses (or prefixes) to other VNSs.

The VNS CLI can also be used to assign address prefixes of up to 30 digits for a VNS area, and individual addresses at a PBX of up to 40 digits. These addresses identify the end-users participating in call attempt as the called party or calling party. These addresses are a telephone-number-like format and assigned according to the VNS-user's numbering plan.

Configured addresses are stored as Address Information records in the VNS Database. These records are displayed in descending order with the largest numerical address displayed first. Thus an Address Information record of 8000 is displayed before 7999 which is displayed before 900, etc.

The VNS can screen addresses, that is, filter calling party and called party numbers. Using the VNS CLI, an operator can create lists of calling party (source addresses) or called party (destination addresses) that will either be allowed or disallowed on a per-PBX-port basis.

The VNS provides address (that is, number) translation to route public network telephone numbers over VNS private networks. This translation feature can be used to translate a public number to a private number for Break-In and a private number to a public number for Break-Out. Number translation is configured with the VNS CLI by providing transformation rules.

The VNS CLI is a series of menus that are used to configure and provision the VNS. When a menu is completed and saved, it becomes a record in the VNS database, which is stored on the VNS disk. An operator can use the VNS CLI to browse the database as well as to modify it.

The VNS creates and stores Call Detail Records (CDRs) for voice (or data) SVCs that it establishes. CDRs are created at the originating-end VNS once a call is set up. CDRs identify whether it is a voice or data call, the calling and called numbers, the local and remote node names, date and timestamp, elapsed time in seconds and Call Failure Class (that is, cause codes). The CDRs are stored in a file and can be retrieved at a fixed interval by a network management system workstation or by any server attached to the Ethernet. The VNS CLI allows an operator to configure CDR File Counts and CDR File Intervals, which define the number of CDR files generated and the interval for which a CDR file will be generated.

The disclosed embodiments presented herein are exemplary. The embodiments can be used with a variety of network protocols, and are appropriate for both LAN and WAN usage. The transport protocols, signaling protocols, control protocols, etc. used in a specific implementation will to some extent depend on the requirements of that implementation. Various other modifications to the disclosed embodiments will be obvious to those of ordinary skill in the art upon reading this disclosure, and are intended to fall within the scope of the invention as claimed.

What is claimed is:

1. A computer-readable medium containing a call processing/routing program for a voice network switching system, the program having:

a switched circuit manager operated by an adjunct processor to set up and tear down switched virtual circuits (SVCs) on a wide-area network, the adjunct processor not being directly coupled to any private branch exchange and conducting all communications with all private branch exchanges through a local switching node in a Wide Area Network (WAN);

a signaling process operated by the adjunct processor to exchange call signaling information with a private branch exchange over a permanent virtual circuit (PVC) established through the local switching node of the wide-area network, the signaling process also exchanging the call signaling information with a remote signaling endpoint over another permanent virtual circuit (PVC) established through the local switching node; and a call processor operated by the adjunct processor in communication with the switched circuit manager and the signaling process to determine a wide area network destination for a wide area network-routed call originating at the private branch exchange, based on call signaling information from the signaling process over the PVCs, and to request a switched virtual circuit (SVC) from the switched circuit manager, to service the wide area network-routed call, the switched circuit manager, signaling process, and call processor operating remotely over the wide area network to establish the SVC through the local switch between the local private branch exchange and the remote signaling endpoint.

2. The computer-readable medium of claim 1, wherein the program has a time-division-multiplexing multiple channel interface driver, the signaling process exchanging call signaling information with the private branch exchange over one channel of a multiple channel interface, using the driver.

3. The computer-readable medium of claim 2, wherein the signaling process exchanges call signaling information with the remote signaling endpoint over a second channel of the multiple channel interface, using the driver.

4. The computer-readable medium of claim 1 wherein the switched circuit manager, signaling process and call processor operate in a Voice Network Switching (VNS) server that is remotely coupled to the local switch over the wide area network.

5. The computer-readable medium of claim 3, wherein the remote signaling endpoint is a second private branch exchange tied to a switching node.

6. The computer-readable medium of claim 1, wherein the program has a frame relay driver, the signaling process exchanging call signaling information with the remote signaling endpoint via the frame relay driver.

7. The computer-readable medium of claim 6, wherein the remote signaling endpoint is a second voice network switching system tied to a switching node.

8. The computer-readable medium of claim 1, wherein the program has a heartbeat process to monitor the status of each switching node that is tied to a private branch exchange that the voice network switching system performs switching for.

9. The computer-readable medium of claim 8, wherein the heartbeat process also monitors the status of a switching node that is used by the switched circuit manager.

10. The computer-readable medium of claim 8, the program having an administrative process, wherein the switched circuit manager and the heartbeat process are execution threads of the administrative process.

11. The computer-readable medium of claim 10, wherein the administrative process executes a redundancy thread that communicates with a second, tandem voice network switching system to provide redundancy capability for the voice network switching capability.

12. The computer-readable medium of claim 10, the program having a signaling/call processing process, wherein the signaling process and call processor are execution threads of the signaling/call processing process.

13. The computer-readable medium of claim 12, wherein the administrative process and the signaling/call processing process communicate with each other using one or more message pipes.

14. A method of operating a voice network switching system connected in a wide-area network, the method comprising:

configuring a first software process to exchange call signaling information with a private branch exchange and a wide-area-network destination over a permanent virtual circuit (PVC), the private branch exchange connected to through a local switching node to the wide-area network and the first software process determining a the wide-area-network destination for a call originating at the private branch exchange based on the call signaling information received from the private branch exchange and the destination switching node through the local switching node over the PVC;

configuring a second software process to establish and manage a switched virtual circuit (SVC) between the private branch exchange and the wide-area-network destination through the local switching node; and providing a message path between the first and second software processes, the first software process using the message path to request the switched virtual circuit (SVC) between the local node and the wide-area-network destination, the second software process using the message path to notify the first software process when the switched virtual circuit (SVC) has been established, the first and second software processes conducting all communication with the private branch exchange and the wide-area-network destination through the local switching node and not communicating directly with any public branch exchange.

15. The method of claim 14, wherein the first software process and the second software process operate in a Voice Network Switching (VNS) server that is remotely coupled to the local node over the wide area network.

16. The method of claim 14, further comprising configuring the first software process to exchange call signaling information with a remote signaling endpoint associated with the wide area network destination.

17. The method of claim 16, wherein the remote signaling endpoint is a second voice network switching system connected to the wide-area network.

18. The method of claim 16, wherein the remote signaling endpoint is a second private branch exchange tied to a switching node of the wide-area network.

19. The method of claim 14, further comprising configuring the second software process to elicit heartbeat responses from the switching node hardware and dynamically adjust system configuration when no heartbeat response is received from a specific piece of hardware within a preset time period.

20. The method of claim 14, further comprising configuring the second software process to report problems with the voice network switching system to a network management system.

21. The method of claim 14, further comprising configuring the second software process to communicate redundancy information with a second voice network switching system for the purpose of providing voice network switching redundancy.

22. A voice network switching system, comprising:

a processor located in a Voice Network Switching (VNS) server configured to establish a permanent virtual circuit over a wide area network with a private branch exchange (PBX) and a call endpoint through a local switching node, the VNS server exchanging all call signaling for the PBX and the call endpoint over the permanent virtual circuit established from the local switching node and not communicating directly with any public branch exchange, the processor remotely from the VNS server dynamically establishing a switch virtual circuit in the wide area network through the switching node that connects the private branch exchange with the call endpoint according to the call signaling received over the permanent virtual circuit.

23. A switching system according to claim 22 wherein the processor establishes another permanent virtual circuit between the switching node and another private branch exchange associated with a call destination.

24. A switching system according to claim 22 including an interface coupling the processor to the switch, the interface including a network interface card, a frame relay interface and an Ethernet interface.

25. A switching system according to claim 22 including a standby voice network device coupled to the switch.

26. A switching system according to claim 22 wherein the processor exchanges call signaling information with the PBX over the permanent virtual circuit (PVC) and determines a wide-area-network destination for a call originating at the private branch exchange based on the call signaling information received over the PVC.

27. A system for operating a voice network switching system connected in a wide-area network, the method comprising:

means for exchanging call signaling information with a private branch exchange over a permanent virtual circuit (PVC), the call signaling information exchanged with the private branch exchange and a wide-area-network destination for a call through a local switching node used by the private branch exchange to access the wide-area network;

means for determining the wide-area-network destination for the call originating at the private branch exchange based on the call signaling information received over the PVC; and means for establishing and managing a switched virtual circuit between the local switching node and the wide-area-network destination remotely through the local switching node according to the signaling information received over the PVC.

28. The system of claim 27 wherein the means for exchanging call signaling information, determining the wide-area-network designation, and means for establishing and managing the switched virtual circuit are located in a Voice Network Switching (VNS) server that is remotely coupled to the local switching node over the wide-area-network.

29. The system of claim 27 including means for eliciting heartbeat responses from the local switching node and dynamically adjusting system configuration when no heartbeat response is received within a preset time period.

30. The system of claim 27 including means for reporting problems with the voice network switching system to a network management system.

31. The system of claim 27 including means for communicating redundancy information with a second voice network switching system for the purpose of providing voice network switching redundancy.

* * * * *

UNITED STATES PATENT AND TRADEMARK OFFICE
CERTIFICATE OF CORRECTION

PATENT NO.    : 6,816,483 B1
DATED         : November 9, 2004
INVENTOR(S)   : Beckstrom et al.

It is certified that error appears in the above-identified patent and that said Letters Patent is hereby corrected as shown below:

Column 11,
Line 61, replace "connected to through a local switching" with -- connected through a local switching --.
Lines 62 and 63, replace "determining a the wide-area-network" with -- determining the wide-area-network --.

Signed and Sealed this

Twenty-seventh Day of December, 2005

JON W. DUDAS
*Director of the United States Patent and Trademark Office*